United States Patent Office 2,792,064
Patented May 14, 1957

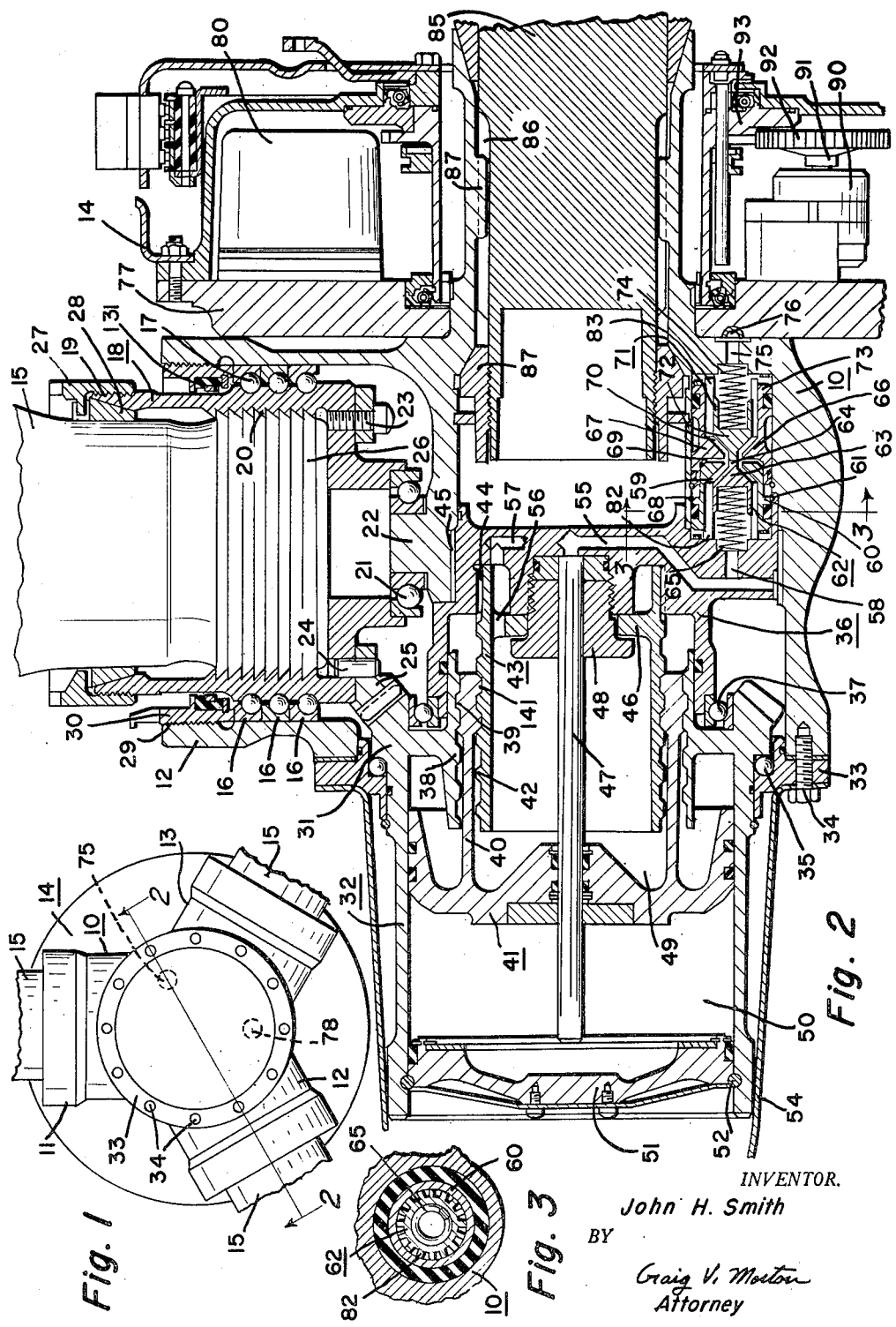

2,792,064

VARIABLE PITCH PROPELLER

John H. Smith, Dayton, Ohio, assignor to General Motors Corporation, Detroit, Mich., a corporation of Delaware Application August 27, 1954, Serial No. 452,537

6 Claims. (Cl. 170—160.32)

This invention pertains to propellers, and particularly to variable pitch propellers including fluid pressure operated means for adjusting the pitch position of the propeller blades.

Heretofore, variable pitch propellers have been designed which include a unitary, hub-carried servo-motor for effecting simultaneous pitch adjustment of a plurality of propeller blades. A propeller assembly of this type is disclosed in the May, et al. Patent No. 2,527,022. This invention constitutes an improvement over the aforementioned patent. Accordingly, among our objects are the provision of a variable pitch propeller having solid blades and improved retention means therefor; the further provision of a propeller including automatically operable sealing means in the connecting passages between the hub and torque unit assembly; and the still further provision of improved hub mounting means for the unitary torque unit assembly.

The aforementioned and other objects are accomplished in the present invention by incorporating a torque unit having a rotatable output member that is integral with the master gear of the pitch adjusting mechanism. Specifically, the improved propeller includes a hub having a plurality of radially extending sockets within which a plurality of propeller blades are supported for rotation about their longitudinal axes. Each propeller blade is connected to a ferrule having integral ball races which receive a ball bearing stack. The ball bearing stack carries the radial and thrust loads of each proeller blade. The blade and ferrule are connected through a split cone arrangement, each ferrule having operative connection with a blade gear that meshes with the master gear.

The master gear is formed as an integral part of the torque unit cylinder, the cylinder being supported for rotation relative to the hub by suitable bearing means. The cylinder is connected through a helical spline arrangement to a reciprocable piston capable of fluid pressure actuation in both directions, under the control of suitable governor controlled valve means. The governor valve means are carried in a regulator assembly which is attached to and rotatable with the propeller hub.

The regulator assembly and the torque unit are connected by axial hub passages. In order to facilitate torque unit assembly and disassembly from the hub, the entire torque unit is attached by means of an annular member, which constitutes the outer race for the cylinder bearing support. In addition, the fluid passage connections between the hub and torque unit include automatically operable sealing means for preventing the loss of regulator fluid medium during assembly and disassembly.

Further objects and advantages of the present invention will be apparent from the following description, reference being had to the accompanying drawing wherein a preferred embodiment of the present invention is clearly shown.

In the drawing:

Fig. 1 is a fragmentary view, in elevation, of a propeller constructed according to this invention.

Fig. 2 is an enlarged, sectional view taken along line 2—2 of Fig. 1.

Fig. 3 is an enlarged sectional view taken on line 3—3 of Fig. 2.

With particular reference to the drawing, the propeller of this invention comprises a hub 10 having three equally spaced, radially extending blade sockets 11, 12 and 13. The aft end of the propeller hub 10 has thereto and rotatable therewith a regulator assembly 14, which for the purposes of the present invention may be considered equivalent in all respects to that disclosed in the aforementioned Patent 2,527,022. Furthermore, each of the several sockets 11 through 13 is adapted to rotatably support a propeller blade 15 for movement about its longitudinal axis.

Inasmuch as all of the propeller blades 15 are supported in a like manner in their respective hub sockets, a detailed description of the blade support of one socket is believed to be sufficient. Thus, with particular reference to Fig. 2, the manner in which the blade 15 is retained within hub socket 12 will be described. The hub socket 12 includes a plurality of outer race members 16, which are adapted to receive a ball bearing stack, generally designated by the numeral 17. The inner races of the ball bearing stack 17 are formed as an integral part of a ferrule 18 having an externally threaded portion 19 and an internally threaded portion 20. The inner end of the ferrule is of reduced diameter and is rotatably supported by bearing means 21 on a hub boss 22, which is concentrically disposed within the hub socket 12. In addition, the inner end of the ferrule 18 is connected by bolts 23 and a dowel pin 24 to a bevel type blade gear 25.

The interiorly threaded portion 20 of the ferrule 18 receives the exteriorly threaded root portion 26 of the solid propeller blade 15. The externally threaded portion 19 of the ferrule 18 receives a blade nut 27 which engages a cone 28, that may be split, the cone 28 being wedged between the ferrule 18 and the blade 15 so as to positively retain the blade in driving relation with the ferrule. In addition, the hub socket 12 includes an interiorly threaded portion 29, which receives a socket nut 30 which functions to retain the outer races 16 of the bearing stack in position. The socket nut 30 may also carry suitable sealing means 131 which exclude dirt from the bearing stack 17.

Each of the several blade gears 25 mesh with a bevel type master gear 31, which is formed as an integral part of a torque unit cylinder 32. The torque unit cylinder is attached to the hub by means of an annular member 33, which is connected to the hub by a plurality of circumferentially spaced bolts 34. The annular member 33 constitutes the outer race for a ball bearing assembly 35, which supports the torque unit cylinder 32 for rotation relative to the hub 10. The master blade gear portion 31 is also supported for rotation relative to a cup-shaped stationary portion 36 of the torque unit assembly by means of a ball bearing assembly 37.

The torque unit assembly is constructed generally in accordance with the teachings of the Blanchard, et al. Patent 2,307,101. Accordingly, the torque unit cylinder includes a portion having helical spline teeth 38, which engage external helical spline teeth 39 formed on an annular skirt 40 of a piston 41 capable of fluid pressure actuation in both directions. The piston 41 is disposed within the cylinder 32, and the skirt portion 40 thereof also includes internal helical spline teeth 141, which mate with external helical spline teeth 42 formed on an annular member 43, that is connected by straight spline teeth 44 to the cup-shaped, fluid transfer member 36. Inasmuch as the cup-shaped member 36 is connected by straight spline teeth 45 to the hub 10, rotation of the cup-shaped member 36 and the fixed spline member 43 relative to the hub 10 is precluded.

The fixed spline member 43 also includes an internal shoulder 46. The cup-shaped member 36 supports a hollow transfer tube 47, which is connected with the cup-shaped member 36 by means of a nut 48 which abuts the shoulder 46. The piston 41 divides the torque unit cylinder into an inboard chamber 49 and an outboard chamber 50, the outboard chamber 50 being sealed by a head member 51, which is retained in position by means of a snap ring 52. In addition, the entire torque unit assembly may be enclosed by a sheet metal member 54 of airfoil configuration.

The transfer tube connects the outboard chamber 50 with a passage 55 in the cup-shaped member 36. The inboard chamber 49 is connected by means of a passage 56 in the fixed spline shoulder 46 to a second passage 57 in the cup-shaped member 36. Inasmuch as the connections between the passages in the cup-shaped member 36 and the hub 10 are identical, a description of the connection between the hub 10 and passage 55 is deemed to suffice.

The passage 55 communicates with a passage 58 in the cup-shaped member 36, the passage 58 communicating with a chamber 59. The chamber 59 contains a cup-shaped valve casing 60 which is suitably retained therein by means of a snap ring 61. The cup-shaped valve casing is adapted to receive a valve element 62 having longitudinally extending flutes 82 and a conical end portion 63 with a projecting nose 64. The valve element 62 also includes a recessed portion in which one end of a coil spring 65 is disposed, the other end of the coil spring engaging the end wall of chamber 59.

The hub 10 is formed with a complementary chamber 66 within which a valve casing 67 is retained by a snap ring 68. A portion of the valve casing 67 sealingly and telescopically receives the end portion of the valve casing 60, the valve casings 60 and 66 being formed with aligned central openings 69 and 70, respectively. In a similar manner, the valve casing 67 is adapted to receive a valve element 71 having longitudinally extending flutes 83 and a conical portion 72 with an extending nose portion 73. Similarly, the valve element 71 includes a recessed portion adapted to receive one end of a coil spring 74, the other end of which abuts the end wall of chamber 66.

When the torque unit assembly is assembled with the hub 10, the nose portions 64 and 73 of the valve elements abut thereby forcing the valve elements 62 and 71 apart so as to interconnect chamber 66 and 59 through the openings 69 and 70, and the fluted valve elements 62 and 71. However, when the torque unit assembly is removed from the hub, the valve element 71 will close the opening 70 in its valve casing 67 under the urge of spring 74. Similarly, the valve element 62 will sealingly engage the opening 69 in its valve casing 60. Thus, the valve element 62 will prevent the loss of fluid from passages 55 and 58, while the valve element 71 will prevent the loss of fluid from hub passage 75, which connects with a passage 76 formed in the front plate 77 of the regulator assembly 14.

The passage 57 communicates with a hub passage 78 through a similar automatic disconnect valve assembly. As stated hereinbefore, the application of pressure fluid to the torque unit assembly is controlled by a governor valve assembly generally depicted by the numeral 80, which is disposed within the regulator assembly 14. The regulator assembly also includes a pump 90, which is attached to the front plate 77, the pump including a driving shaft 91, which is connected with a gear 92. The gear 92 has operative engagement with a fixed adapter assembly about which the regulator assembly rotates. Inasmuch as the regulator assembly 14 contains a suitable fluid medium, it will be appreciated that upon rotation of the regulator 14, the pump 90 will be driven so as to draw fluid from the reservoir and increase the pressure potential thereof. The governor valve assembly 80 may be of the type disclosed in the aforementioned Patent 2,527,022 and, accordingly, operates to direct the application of fluid under pressure to either passage 55 or passage 57, thereby controlling the actuation of the unitary torque unit.

The propeller hub 10 may be connected with an engine driven shaft 85 through a conventional cone assembly 86. In addition, the hub 10 and the shaft 85 may be rotatably connected by interengaging spline teeth 86 and 87.

Operation of the variable pitch propeller is as follows. Upon the application of fluid pressure to the passage 55, while the passage 57 is connected to drain, fluid pressure will be applied to the outboard chamber 50 while the inboard chamber 49 is connected to drain. Accordingly, the piston 41 will move to the right, as viewed in the drawing, thereby imparting rotation in one direction to the cylinder 32, which has a helical spline connection with the piston skirt 40. Inasmuch as the cylinder 32 is integral with the master blade gear 31, which has operative engagement with all of the respective blade gears 25, rotation will be imparted simultaneously to each propeller blade 15 through their respective ferrules. Conversely, upon the application of fluid pressure to passage 57 while the passage 55 is connected to drain, the torque unit piston 41 will move to the left, as viewed in the drawing, thereby imparting rotation to the cylinder 32 in the opposite direction.

While the embodiment of the present invention as herein disclosed, constitutes a preferred form, it is to be understood that other forms might be adopted.

What is claimed is as follows:

1. A variable pitch propeller including in combination, a hub having a plurality of radially extending sockets, a plurality of propeller blades disposed in said sockets and operatively supported for rotation about their longitudinal axes to different pitch positions, a gear operatively connected to each blade for effecting rotation thereof about its longitudinal axis, a master gear operatively engaging all of said blade gears, and fluid pressure actuated means for imparting rotation to said master gear, said fluid pressure actuated means being disposed axially of the hub and comprising a cylinder integral with said master gear and supported for rotation about the horizontal propeller axis relative to said hub, a reciprocable piston disposed in said cylinder capable of fluid pressure actuation in both directions, means operatively interconnecting said piston and said cylinder for imparting rotation to said cylinder upon reciprocation of said piston, a fluid transfer member nonrotatably attached to said hub and removable therefrom having passages connecting with said cylinder on opposite sides of said piston, and bearing means carried by said transfer member for supporting said cylinder and said master gear for rotation relative to said hub.

2. A variable pitch propeller including in combination, a hub having a plurality of radially extending sockets, a plurality of propeller blades disposed in said sockets and operatively supported for rotation about their longitudinal axes to different pitch positions, the operative support for each blade comprising a ferrule rotatably supported in each socket and drivingly connected with its respective blade, a gear operatively connected to each blade for effecting rotation thereof about its longitudinal axis, a master gear operatively engaging all of said blade gears, said master gear being supported for rotation relative to said hub, fluid pressure actuated pitch changing means for imparting rotation to said master gear, said fluid pressure actuated means being disposed axially of the hub and comprising a cylinder integral with said master gear and supported for rotation about the horizontal propeller axis relative to said hub, a reciprocable piston disposed in said cylinder capable of fluid pressure actuation in both directions, means operatively interconnecting said piston and said cylinder for imparting rotation to said cylinder upon reciprocation of said piston and a fluid transfer member nonrotatably attached to said hub and removable therefrom having passages connecting with said cylinder on opposite sides of said piston, and an annular member attached to said hub and operatively engaging said cylinder for maintaining said pitch adjusting means in assembled relation with said hub.

3. A variable pitch propeller including in combination, a hub having a plurality of radially extending sockets, a plurality of propeller blades disposed in said sockets and operatively supported for rotation about their longitudinal axes to different pitch positions, the operative support for each blade including a ferrule, means rotatably supporting said ferrule in its respective blade socket, means drivingly interconnecting said ferrule with its respective blade, and means supporting said ferrule for rotation about a hub boss disposed concentrically within its respective hub socket, a gear operatively connected to each blade for effecting rotation thereof about its longitudinal axis, a master gear operatively engaging all of said blade gears, said master gear being supported for rotation relative to said hub and fluid pressure actuated means for imparting rotation to said master gear, said fluid pressure actuated means being disposed axially of the hub and comprising a cylinder integral with said master gear and supported for rotation about the horizontal propeller axis relative to said hub, a reciprocable piston disposed in said cylinder capable of fluid pressure actuation in both directions, means operatively interconnecting said piston and said cylinder for imparting rotation to said cylinder upon reciprocation of said piston, a fluid transfer member nonrotatably attached to said hub and removable therefrom having passages connecting with said cylinder on opposite sides of said piston, and bearing means carried by said transfer member for supporting said cylinder and said master gear for rotation relative to said hub.

4. In a variable pitch propeller having a hub with a plurality of radially extending sockets, each socket having a propeller blade supported therein for rotation about its longitudinal axis to different pitch positions, and a blade gear operatively connected to each propeller blade for imparting rotation thereto; a readily detachable pitch changing power unit disposed axially of said hub for simultaneously imparting rotation to all of said blade gears, comprising, a cylinder supported for rotation about the horizontal propeller axis relative to said hub and including an integral master gear having engagement with all of said blade gears, a reciprocable piston disposed in said cylinder capable of fluid pressure actuation in both directions, means operatively interconnecting said piston and said cylinder for imparting rotation to said cylinder upon piston reciprocation and a fluid transfer member having a straight spline connection with said hub so as to be removable therefrom and having passages connecting with said cylinder on opposite sides of said piston, and an annular member attached to said hub and operatively engaging said cylinder for maintaining said pitch changing power unit in assembled relation with said hub.

5. The combination set forth in claim 4 wherein said passages in the fluid transfer member are arranged to connect with complementary passages in said hub, and wherein the juncture between the passages in said hub and in said power unit include automatically operable valve means for sealing said passages upon detachment of said power unit from said hub.

6. The combination set forth in claim 5 wherein said automatically operable valve means include a valve casing carried by said power unit, a valve casing carried by said hub, said valve casings being arranged in telescopic relationship and having aligned openings, and a spring biased valve element disposed within each valve casing, said valve elements being constructed and arranged to close the opening in its respective valve casing upon detachment of said power unit and adapted to abut each other so as to permit the passage of fluid through said aligned openings when said power unit is assembled with said hub.

References Cited in the file of this patent

UNITED STATES PATENTS

| 2,504,569 | Murphy et al. | Apr. 18, 1950 |
| 2,527,022 | May et al. | Oct. 24, 1950 |
| 2,612,959 | Blanchard et al. | Oct. 7, 1952 |

FOREIGN PATENTS

| 127,984 | Sweden | Apr. 11, 1950 |